United States Patent
Dominguez

(10) Patent No.: US 10,460,382 B2
(45) Date of Patent: *Oct. 29, 2019

(54) FRAUD REDUCTION SYSTEM FOR TRANSACTIONS

(71) Applicant: Visa International Service Association, San Francisco, CA (US)

(72) Inventor: Benedicto Hernandez Dominguez, San Bruno, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/115,375

(22) Filed: Aug. 28, 2018

(65) Prior Publication Data

US 2018/0374152 A1  Dec. 27, 2018

Related U.S. Application Data

(63) Continuation of application No. 12/903,916, filed on Oct. 13, 2010, now Pat. No. 10,089,683.

(60) Provisional application No. 61/302,436, filed on Feb. 8, 2010.

(51) Int. Cl.
G06Q 40/00 (2012.01)
G06Q 20/40 (2012.01)

(52) U.S. Cl.
CPC ............ *G06Q 40/00* (2013.01); *G06Q 20/40* (2013.01); *G06Q 20/4016* (2013.01)

(58) Field of Classification Search
CPC ............................... G06Q 40/00; G06Q 20/40
See application file for complete search history.

(56) References Cited

U.S. PATENT DOCUMENTS

| | | |
|---|---|---|
| 7,007,840 B2 | 3/2006 | Davis |
| 7,231,657 B2 | 6/2007 | Honarvar et al. |
| 2002/0099649 A1 | 7/2002 | Lee et al. |
| 2002/0161723 A1 | 10/2002 | Asokan et al. |
| 2003/0069820 A1 | 4/2003 | Hillmer et al. |

(Continued)

FOREIGN PATENT DOCUMENTS

| | | |
|---|---|---|
| CN | 1666211 | 9/2005 |
| CN | 1930591 | 3/2007 |

(Continued)

OTHER PUBLICATIONS

U.S. Appl. No. 12/903,916, "Advisory Action", dated Jan. 29, 2014, 2 pages.

(Continued)

*Primary Examiner* — Lalita M Hamilton
(74) *Attorney, Agent, or Firm* — Kilpatrick Townsend & Stockton LLP

(57) ABSTRACT

A system, apparatus, and method for reducing fraud in payment or other transactions by providing issuers with a warning that a transaction being processed for authorization is potentially fraudulent. In some embodiments, the present invention processes data obtained from a consumer authentication process that is used in card not present (CNP) transactions to determine characteristics or indicia of fraud from previous transactions. The characteristics or indicia of fraud can be used to generate a set of fraud detection rules or another form of fraud assessment model. A proposed transaction can then be evaluated for potential fraud using the fraud assessment model.

20 Claims, 8 Drawing Sheets

(56) References Cited

U.S. PATENT DOCUMENTS

| | | | |
|---|---|---|---|
| 2004/0019564 | A1 | 1/2004 | Goldthwaite et al. |
| 2006/0064391 | A1 | 3/2006 | Petrov et al. |
| 2006/0271397 | A1 | 11/2006 | Allin et al. |
| 2008/0120214 | A1 | 5/2008 | Steele et al. |
| 2009/0099959 | A1 | 4/2009 | Liao et al. |
| 2010/0005013 | A1 | 1/2010 | Uriarte |
| 2010/0023437 | A1 | 1/2010 | Davis |
| 2010/0114776 | A1 | 5/2010 | Weller et al. |
| 2011/0071946 | A1 | 3/2011 | Handler |
| 2011/0196791 | A1 | 8/2011 | Dominguez |
| 2012/0084211 | A1 | 4/2012 | Petrov et al. |
| 2012/0271768 | A1 | 10/2012 | Kang |

FOREIGN PATENT DOCUMENTS

| | | |
|---|---|---|
| CN | 101523428 | 9/2009 |
| KR | 20080018614 | 2/2008 |
| KR | 1020080018614 | 2/2008 |
| WO | 2010056969 | 5/2010 |

OTHER PUBLICATIONS

U.S. Appl. No. 12/903,916 , "Final Office Action", dated Aug. 29, 2013, 12 pages.
U.S. Appl. No. 12/903,916 , "Final Office Action", dated May 4, 2015, 21 pages.
U.S. Appl. No. 12/903,916 , "Non-Final Office Action", dated Sep. 27, 1012, 10 pages.
U.S. Appl. No. 12/903,916 , "Non-Final Office Action", dated Sep. 25, 2014, 13 pages.
U.S. Appl. No. 12/903,916 , "Notice of Allowance", dated Jun. 28, 2018, 10 pages.
U.S. Appl. No. 12/903,916 , "Supplemental Notice of Allowance", dated Jul. 11, 2018, 2 pages.
AU2011213620 , "First Examiner Report", dated Jun. 24, 2014, 3 pages.
AU2011213620 , "Second Examiners Report", dated Oct. 3, 2014, 3 pages.
AU2011213620 , "Third Examination Report", dated Mar. 6, 2015, 3 pages.
CN201180014795.6 , "Office Action", dated Jun. 3, 2016, 10 pages.
CN201180014795.6 , "Office Action", dated Mar. 27, 2015, 18 pages.
CN201180014795.6 , "Office Action", dated Dec. 2, 2015, 19 pages.
EP11740537.3 , "Extended European Search Report", dated Jan. 9, 2015, 6 pages.
PCT/US2011/024092 , "International Preliminary Report on Patentability", dated Aug. 23, 2012, 8 pages.
PCT/US2011/024092 , "International Search Report and Written Opinion", dated Sep. 19, 2011, 11 pages.
IN7601/CHENP/2012 , "First Examination Report", dated Mar. 12, 2019, 6 pages.

FRAUD REDUCTION SYSTEM FOR TRANSACTIONS

CROSS REFERENCE TO RELATED APPLICATIONS

This application is a non-provisional continuation application of and claims the benefit of and priority to U.S. patent application Ser. No. 12/903,916, entitled, "FRAUD REDUCTION SYSTEM FOR TRANSACTIONS," filed Oct. 13, 2010, which claims priority from U.S. Provisional Patent Application No. 61/302,436, entitled "Fraud Reduction System for Payment Transactions", filed Feb. 8, 2010, both of which are herein incorporated by reference in their entirety for all purposes.

BACKGROUND

Embodiments of the present invention are directed to systems, apparatuses and methods for reducing fraud in transactions, and more specifically, to the detection of potential fraud in payment and other transactions by processing data derived from previous transactions in which a consumer used a credential or password to authenticate themselves. Embodiments of the invention may be used for multiple types of transactions, including, but not limited to, payment transactions such as eCommerce transactions in which a payment device is not presented to a merchant at the time of the transaction. Further, embodiments of the invention may be used to provide an indication of fraud in a real-time transaction processing environment, enabling issuers to take actions to reduce fraud prior to processing a transaction authorization message for a payment or other transaction. By detecting the possibility of fraud at an earlier stage of the transaction processing, the present invention can act to reduce the data processing and other network resources that would otherwise be applied to such transactions, as well as reducing losses that might otherwise occur if fraud was not detected until a later time.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. A consumer may also initiate a payment transaction by providing payment data from a remote location to a merchant over a network such as the Internet. Transactions of this type are typically initiated using a computing device such as a personal computer or laptop computer. Transactions may also be initiated by using a mobile device such as a cell phone or personal data assistant (PDA) that communicates with a merchant or service provider directly or indirectly over a wireless network. Transactions in which the consumer is not in the same physical location as a merchant, and hence where a payment device is not physically presented to the merchant, are termed "card not present" (CNP) transactions.

Given the large number of transactions and amounts of money involved, the detection and prevention of fraud is an important consideration of any transaction processing system. In order to address this problem, payment processors and others involved in authorizing a transaction have developed data analysis tools designed to identify potentially fraudulent behavior within an individual account and over a set of transactions as a whole. These tools may be used as a form of transaction risk assessment to provide an issuer with an estimate or indicator of the risk associated with a proposed payment or other transaction. If the assessment indicates an unacceptable level of risk for a particular transaction, then the issuer can refuse or deny the transaction. This prevents the consumer from being able to complete the transaction with a merchant. Typically, the risk assessment is implemented in the form of rules, where if a transaction satisfies the conditions of a rule, it is considered to be a fraudulent transaction or one deserving of further scrutiny prior to being authorized.

Although present forms of transaction risk assessment provide a benefit to the parties involved in transactions, such transaction data processing tools do have disadvantages, particularly in terms of their use for real-time processing of transactions. For example, the data used to evaluate the potential for fraud in a transaction is typically obtained from a transaction authorization request message that is generated by a merchant or the merchant's data processing system. While this information is useful, there may be other information that is collected as part of the processing of certain types of payment or other transactions that can be used to determine if a proposed transaction is likely to be fraudulent. In addition, in some cases, more effective fraud deterrence may be obtained by providing a warning to issuers earlier in the processing of transaction data that a particular account is associated with previous fraudulent transactions or is considered to be a risk for conducting fraudulent transactions.

What is desired are a system, apparatus and method for reducing fraud in payment or other transactions, such as card not present transactions, by providing issuers with a warning that a transaction being processed for authorization is potentially fraudulent. Embodiments of the invention address these problems and other problems individually and collectively.

SUMMARY

Embodiments of the present invention are directed to systems, apparatuses, and methods for reducing fraud in payment or other transactions by providing issuers with a warning that a transaction being processed for authorization is potentially fraudulent. In some embodiments, the present invention processes data obtained from a consumer authentication process that is used in card not present (CNP) transactions to determine characteristics or indicia of fraud from previous transactions. The characteristics or indicia of fraud can be used to generate a set of fraud detection rules or another form of fraud assessment model. A proposed transaction can then be evaluated for potential fraud using the fraud assessment model. If the proposed transaction is determined to be fraudulent or potentially fraudulent, then an issuer of the payment account being used for the proposed transaction may be notified. In response, the issuer can update their data records to indicate that future transactions involving the same payment account should be declined or be subjected to additional restrictions or conditions prior to authorizing a transaction. In another embodiment, a directory server that is part of a consumer authentication process used in a card not present transaction can be notified that a particular payment account is suspected of being engaged in (or has been engaged in) fraudulent activity. In response, the directory server or an authentication process that uses the server can decline future requests to authenticate a consumer using the same account. Because the inventive fraud detection process is performed as part of a consumer authentication operation that occurs prior to the standard transaction authorization processing, embodiments of the invention may provide an early indication or warning of a potentially fraudulent transaction. This can save time and data processing resources that might otherwise be spent processing data related to the transaction before it is identified as fraudulent. The early warning of an attempt to commit fraud may also reduce the likelihood of actual fraud being committed, thereby preventing losses that might otherwise occur.

In one embodiment, the present invention is directed to an apparatus for processing a transaction, where the apparatus includes a processor programmed to execute a set of instructions, a memory coupled to the processor for storing the set of instructions, and the set of instructions stored in the memory, wherein when executed by the programmed processor the apparatus processes the transaction by receiving consumer authentication data for card not present transactions from an authentication history server, receiving transaction data for a known fraudulent transaction, processing the authentication data and transaction data to generate a rule operative to identify whether a proposed transaction is fraudulent, receiving transaction data for the proposed transaction, applying the generated rule to the transaction data for the proposed transaction, and based on the application of the generated rule, determining if the proposed transaction is fraudulent.

In another embodiment, the present invention is directed to a system for reducing fraud in transactions, where the system includes an authentication history server storing data records of consumer authentication operations for card not present transactions, and a risk management engine operative to process the data records and process transaction data for known fraudulent transactions to determine one or more rules for identifying a fraudulent transaction, receive transaction data for a proposed transaction, receive data from the authentication history server for an account corresponding to the proposed transaction, apply the one or more rules for identifying a fraudulent transaction to the data received from the authentication history server and the transaction data for the proposed transaction, and generate a message identifying the proposed transaction as fraudulent based on the outcome of applying the one or more rules.

In yet another embodiment, the present invention is directed to a method of reducing fraud in transactions, where the method includes receiving consumer authentication data for card not present transactions from an authentication history server, receiving transaction data for a known fraudulent transaction, and processing the authentication data and transaction data in an electronic data processor to generate a rule operative to identify whether a proposed transaction is fraudulent.

Other objects and advantages of the present invention will be apparent to one of ordinary skill in the art upon review of the detailed description of the present invention and the included figures.

DETAILED DESCRIPTION

Figure 1:
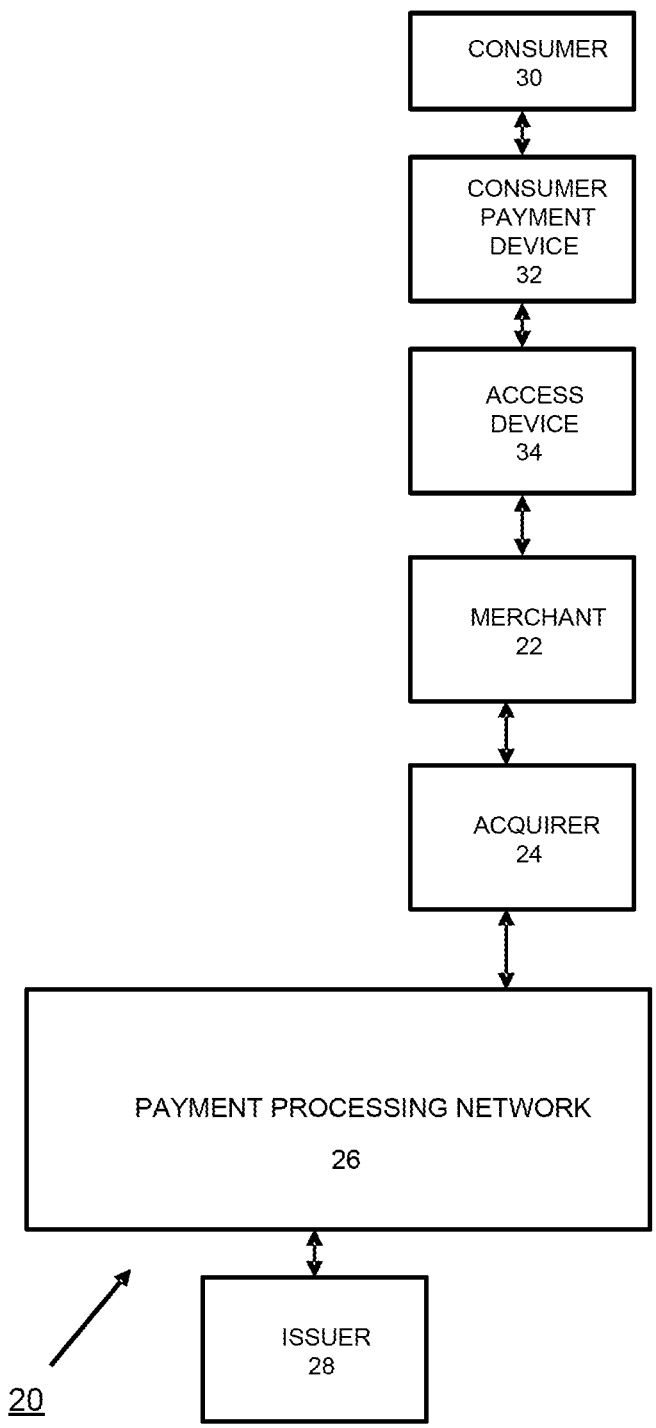
FIG. 1 is a diagram illustrating the primary functional elements of a system for conducting a payment or other transaction and processing transaction data that may be used in implementing an embodiment of the present invention.

Embodiments of the present invention are directed to systems, apparatuses, and methods for reducing fraud in payment or other transactions by providing issuers with a warning that a transaction being processed for authorization is potentially fraudulent. In some embodiments, the present invention processes data obtained from a consumer authentication process that is used in card not present (CNP) transactions to determine characteristics or indicia of fraud from previous transactions. The characteristics or indicia of fraud can be used to generate a set of fraud detection rules or another form of fraud assessment model. A proposed transaction (such as an eCommerce transaction) can then be evaluated for potential fraud using the fraud assessment model.

In some embodiments, the present invention may be implemented as an additional service or feature of a consumer authentication system or protocol such as the 3D Secure protocol used to provide user authentication/authorization in eCommerce transactions. The 3D Secure protocol has been implemented by Visa, the assignee of the present invention, as part of a service known as the Verified-by-Visa (VbV) service. As will be described further, in addition to other benefits, embodiments of the invention can provide one or more of the following services:

1. An early warning system to detect and report suspicious and potentially fraudulent activity—this can provide timely notice to appropriate parties and network endpoints and reduce the likelihood of a fraudulent transaction being conducted, as well as reduce the use of data processing resources (for processing transaction data) that might otherwise be expended before a transaction was identified as potentially fraudulent;

2. In some situations, embodiments of the invention may act as a stand-in to protect an authentication/authorization system from attack—in this case the invention may act as a shield to prevent fraudulent transactions or to prevent the possibility of an attempt to fraudulently authenticate a large set of transactions through the standard authentication request and response message system; and 3. Act as a "safety net" to assist payment processing networks to identify issuers who are not proactively managing their implementation of the CNP authentication system or its authorization logic.

Embodiments of the present invention can accomplish these goals without significantly impacting the current operation and message exchange protocols of existing consumer authentication and transaction authorization systems. This makes it easier and less disruptive to implement the present invention compared to other types of authentication or authorization system improvements.

Embodiments of the present invention are typically implemented in the context of a payment or other transaction, and specifically, in the context of the processing of transaction data as part of (or prior to) a transaction authorization process. In some cases, embodiments of the invention may be implemented as an augmentation or value add to an existing consumer authentication protocol, such as the 3D Secure protocol used to provide user authentication/authorization in eCommerce transactions. Therefore, prior to describing one or more embodiments of the invention in greater detail, a brief discussion of the entities involved in processing and authorizing a payment or other transaction and their roles in the processing of transaction data, will be presented.

FIG. 1 is a diagram illustrating the primary functional elements of a system 20 for conducting a payment or other transaction and processing transaction data that may be used in implementing an embodiment of the present invention. Typically, an electronic transaction is authorized if the consumer conducting the transaction is properly authenticated (i.e., their identity and their valid use of an account is verified) and has sufficient funds or credit to conduct the transaction. Conversely, if there are insufficient funds or credit in the consumer's account, or if the consumer's device is on a negative list (e.g., it is indicated as inactive or possibly having been stolen), then an electronic transaction may not be authorized. In the following description, an "acquirer" is typically a business entity (e.g., a commercial bank) that has a business relationship with a particular merchant. An "issuer" is typically a business entity (e.g., a bank or credit union) which issues a payment device such as a credit card, debit card, smart card, or contactless payment device to a consumer. Some entities may perform both issuer and acquirer functions.

As shown in FIG. 1, in a typical transaction, a consumer 30 wishing to purchase a good or service from a merchant 22 provides transaction data that may be used as part of a transaction authorization process, typically by means of a consumer device 32 that is capable of functioning as a payment device. Consumer 30 may utilize a consumer payment device 32 such as a card having a magnetic stripe encoded with account data or other relevant data (e.g., a standard credit or debit card) to initiate the transaction. In an eCommerce (electronic commerce) transaction, the consumer may enter data into a consumer payment device, such as a laptop or personal computer, that is capable of communicating with a merchant or other element of system 20. The consumer may also initiate the transaction using data stored in and provided from a suitable form of data storage device (such as a smart card, a mobile phone or PDA containing a contactless element, or a transportable memory device). As examples, a card or similar payment device may be presented to a point of sale (POS) terminal which scans or reads data from that card. Similarly, a consumer may enter payment account data into a computing device as part of an eCommerce transaction. Further, a consumer may enter payment account data into a cell phone or other device capable of wireless communication (e.g., a laptop computer or personal digital assistant (PDA)) and have that data communicated to the merchant, the merchant's data processing system, or a transaction authorization network by the device. A wireless device may also be used to initiate a payment transaction by means of communication with a merchant device reader or point of sale terminal using a near field communications (NFC) or other short range communications mechanism, such as RF, infra-red, optical, etc. Thus, in some cases an access device 34 may be used to read, scan, or otherwise interact with a consumer's payment device 32 and thereby obtain data used in conducting a transaction.

The payment account data (and if needed for processing the transaction, other consumer data) is obtained from the consumer's device and provided to the merchant 22 or to the merchant's data processing system. Typically, the merchant or the merchant's data processing system generates a transaction authorization request message that may include data obtained from the consumer's payment device as well as other data related to the transaction and the merchant (e.g., the transaction amount, a merchant identification code, etc). As part of generating the authorization request message, the merchant 22 or the merchant's transaction data processing system may access a database which stores data regarding the consumer, the consumer's payment device, and the consumer's previous transactions with the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to Payment Processing Network 26, which among other functions, participates in the clearance and settlement processes which are part of the overall transaction processing. Payment Processing Network 26 may also serve as a communication channel for the exchange of authorization request and authorization response messages related to payment or other transactions. As part of the transaction authorization process, an element of Payment Processing Network 26 may access an account database which contains information regarding the consumer's payment history for an account, chargeback or dispute history, credit worthiness, etc. Payment Processing Network 26 communicates with issuer 28 as part of the authorization process, where issuer 28 is the entity that issued the payment device to the consumer and manages the consumer's account. Consumer account data is typically stored in a consumer database which is accessed by issuer 28 as part of the transaction authorization and account management processes.

In standard operation, an authorization request message is created during a consumer purchase (or proposed purchase) of a good or service at a point of sale (POS). The point of sale may be a merchant's physical location or a virtual point of sale such as a web-site that is part of an eCommerce transaction. In a typical transaction, the authorization request message is sent from the point of sale (e.g., the merchant or the merchant's transaction data processing system) to the merchant's acquirer 24, then to the Payment Processing Network 26, and then to the appropriate issuer 28. An authorization request message can include a request for authorization to conduct an electronic payment or other transaction. It may include one or more of an account holder's primary account number (PAN), payment device expiration date, currency code, sale amount, merchant transaction stamp, acceptor city, acceptor state/country, etc. An authorization request message may be protected using a secure encryption method (e.g., 128-bit SSL or equivalent) in order to prevent data from being compromised.

Consumer payment device 32 may be in any suitable form that can function as a payment device or that may incorporate a payment device. For example, suitable consumer payment devices can be hand-held and compact so that they can fit into a consumer's wallet and/or pocket (e.g., pocket-sized). Suitable devices include contact or contactless smart cards, credit or debit cards (typically with a magnetic stripe and without an embedded microprocessor), keychain devices (such as the Speedpass™ commercially available from Exxon-Mobil Corp.), and depending upon the specific device, may incorporate a contactless element that is configured to enable it to function as a payment device. Further examples of suitable consumer payment devices include cellular phones, personal digital assistants (PDAs), pagers, payment cards, security cards, access cards, smart media, transponders, and the like, where such devices may incorporate a contactless element. The payment devices may function as a debit device (e.g., a debit card), a credit device (e.g., a credit card), or a stored value device (e.g., a stored value or prepaid card).

Payment Processing Network 26 may include data processing subsystems and networks, and be configured to implement operations used to support and deliver authorization services, exception file services, and clearing and settlement services. An exemplary payment processing network may include VisaNet, which is operated by Visa. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for authorized transactions.

Payment Processing Network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. Payment Processing Network 26 may use any suitable wired or wireless network, including the Internet, to facilitate communications and data transfer between its component system elements.

In some payment or other transaction processing systems, in order to reduce the possibility of fraud in a card not present (CNP) transaction, a separate consumer authentication process may be implemented. For example, one type of authentication process enables a consumer (e.g., a cardholder) to associate a password, credential or other identifying information with a payment account. As part of an eCommerce or other form of card not present transaction, the consumer is required to provide the password, credential or other identifying information associated with the payment account. This ensures that the person providing the payment account data in a card not present transaction is actually authorized to use the payment account for transactions. In some embodiments of the present invention, data obtained by such an authentication process is processed to identify characteristics of fraudulent transactions and to identify payment accounts that have been used for fraudulent transactions. Information regarding these payment accounts can then be provided to issuers and/or to elements of a payment processing system to prevent use of the accounts in a current or future transaction. The identified characteristics can also be used as a form of fraud detection model to assess whether a proposed transaction is likely to be fraudulent, where this fraud assessment can be conducted prior to the standard transaction authorization process. The "early warning" of potential fraud provided by the invention may serve to prevent the unnecessary use of data processing resources that might otherwise be applied to processing authorization messages for a proposed transaction that is identified by the invention as being fraudulent or deserving of further scrutiny.

As noted, consumer authentication data may consist of a password, credential or other security data that has previously been associated with a valid user of a payment account. In such a use case, an account owner may have previously registered their account with an appropriate entity (e.g., a payment processor, payment processing network, or issuer) and submitted a password or other form of credential or security data that is associated with their account. During a card not present transaction, the consumer may be requested to provide their password, credential or security data in order to authenticate themselves and permit authorization of the transaction. One implementation of such an authentication process is as part of the 3D Secure protocol, such as in the Verified-by-Visa (VbV) program provided by Visa, where a consumer authentication operation is executed prior to the generation of a transaction authorization request message.

As an example, a suitable authentication process with which embodiments of the present invention may be utilized, or which embodiments of the present invention may be used to modify, is described in U.S. Pat. No. 7,007,840, entitled "Managing Activation of Cardholders in a Secure Authentication Program", issued Mar. 7, 2006, and the contents of which is hereby incorporated by reference it its entirety for all purposes.

Figure 2:
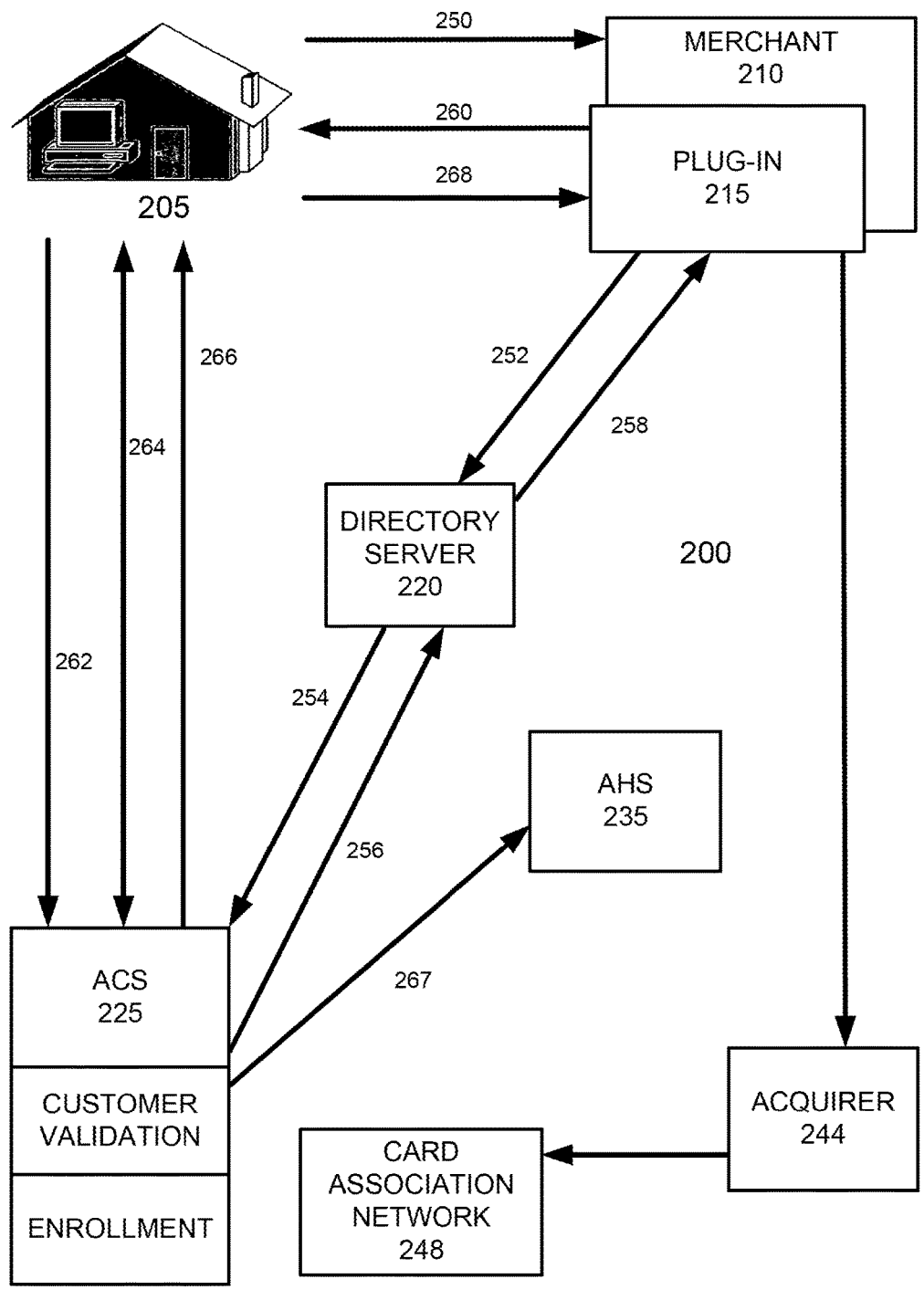
FIG. 2 is a diagram illustrating a card or payment device authentication system which may be used with embodiments of the present invention.

FIG. 2 is a diagram illustrating a card or payment device authentication system 200 which may be used with embodiments of the present invention. In some embodiments, system 200 enables consumers to be authenticated when making electronic commerce purchases online using a payment account or other form of card not present transaction. In an embodiment, account owner system 205 initiates an online purchase by accessing a merchant computer 210. In an embodiment, account owner system 205 accesses a website provided by the merchant computer 210 via the Internet using a web browser. Alternatively, account owner system 205 may access the merchant computer 210 via an alternate electronic communications network. Account owner system 205 can be any suitable type of communications device, for example a personal computer, laptop computer, a personal digital assistant, mobile phone, or a telephone. In some embodiments, account owner system 205 may include (or be capable of functioning as) a payment device, such as a contactless element that contains payment account data. To conduct a transaction, a consumer may use account owner system 205 to submit his or her payment account information 250, such as a card/account number and expiration date, to merchant system 210. In an embodiment, a secure communication system, such as SSL, is used for all communications, including the payment account information 250.

In response to receiving the payment account information 250, the merchant system initiates an authentication procedure to determine whether the payment account information is valid and if it has been provided by an authorized person.

In an embodiment of system 200, there are multiple payment account issuers or payment device issuers. Each account or device issuer is responsible for authenticating its own payment accounts or devices. To authenticate the payment account information 250, merchant system 210 locates the authentication service of the issuer associated with the payment account information 250. To determine the appropriate authentication service, merchant system 210 sends a verifying enrollment request (VEReq) message 252 to a directory server (DS) 220. In some embodiments, directory server 220 may be operated by a payment processor or payment processing network. In some embodiments, communications for authentication-related operations are coordinated by an authentication plug-in 215 which is integrated with the merchant system 210. The VEReq message 252 typically includes at least a portion of the payment account information 250, which is used by directory server 220 to identify the authentication service associated with the account owner's payment account. In some embodiments, each payment account or device issuer is assigned a different range of payment account numbers or identifiers. In a typical embodiment, directory server 220 includes a list of all payment account or device issuers and their associated payment account or device number ranges. By comparing the payment account information provided by the account owner system with the list of payment account or device issuers, directory server 220 is able to identify the appropriate authentication service.

After identifying the appropriate authentication service for the payment account or device being used for the transaction, directory server 220 forwards the VEReq message 254 to an access control server (ACS) 225 associated with the account or device issuer's authentication service. The ACS 225 determines whether the payment account information provided in the VEReq message 254 can be authenticated. Payment account information may not be able to be authenticated by the ACS 225 if, for example, the information does not include a valid account number, or if there is no authentication information associated with the account number. If the payment account information provided in the VEReq message 254 can be authenticated, then the ACS 225 sends a verified enrollment response (VERes) message 256 back to directory server 220. The VERes message 256 includes data indicating that the ACS 225 can authenticate the payment account information, and the message may contain a pseudonym corresponding to the account number. The pseudonym can be any type of code or number that can be uniquely linked to payment account information by the ACS 225 at a later time. The VERes message 256 may also include a URL or other reference to a web page or network location that may be accessed by account owner system 205 as part of authenticating the account owner. In some embodiments of system 200, the URL is associated with a web site provided by the ACS 225. Upon receiving a VERes message 256 from the ACS 225, directory server 220 forwards the VERes message 258 to merchant system 210.

From the received VERes message 258, merchant system 210 generates an authentication request message. The authentication request message may include the pseudonym created by the ACS 225 and certain transaction information associated with the consumer's prospective purchase. Merchant system 210 then forwards the authentication request message 260 to the account owner system 205. In some embodiments, the authentication request is sent to the account owner system 205 with a web page having a redirection command (such as an HTTP redirect to a web site hosted by the ACS 225). This web page also typically includes a URL for returning information to merchant system 210. In response to the authentication request received from merchant system 210, the account owner system 205 accesses a web site 262 hosted by the ACS 225. In some embodiments, in accessing this web site, the account owner system 205 supplies the ACS 225 with the pseudonym originally created by the ACS for the VERes message. The account owner authenticates his or her identity by presenting authentication information 264 to the web site provided by the ACS 225. In some embodiments, the account owner authenticates his or her identity by providing to the ACS 225 a password, credential, or other identifying information previously associated with their account. If the pseudonym data is used, the ACS 225 uses the pseudonym provided by the account owner system to identify the payment account or device being used by the account owner and to access authentication information previously associated with the account. In some embodiments, the ACS 225 compares the pseudonym received from the account owner system with the pseudonym previously created for the VERes message 256. In some embodiments, the pseudonym may expire after a limited period of time, for example five minutes, to prevent fraudulent reuse of the authentication request that was forwarded to the account owner system and then used to access the web site hosted by ACS 225.

The ACS 225 returns an authentication response message 266 to the account owner system 205. The account owner system 205 forwards the authentication response message 268 to the merchant system 210. If the authentication information 264 provided by the account owner matches the authentication information previously associated with the account being used for the proposed transaction, then the authentication response message 266 includes data indicating that the authentication process was successful. Alternatively, the authentication response message 266/268 can include data indicating that the authentication process failed. In some embodiments, the authentication response message 266/268 may include an error code identifying the reason for failure of the authentication process.

In addition to sending the authentication response message 266/268 to the merchant system 210, a copy of the authentication response message 267 is sent to an authentication history server (AHS) 235. The authentication history server 235 maintains an archive of all authentication operations performed or attempted to be performed by system 200. In some implementations, the authentication response message is digitally signed to prevent the account owner system 205 or other third party systems from tampering with the contents of the authentication response message. After receiving the authentication response message 268, the merchant system 210 validates the authentication response message. To validate the authentication response message 268, the merchant system 210 may verify the digital signature associated with the authentication response message to ensure that it has not been subjected to tampering. Once the authentication response message is determined to have arrived intact, and that the response is for the request originally submitted, the contents of the authentication response message are analyzed to determine if the authentication process has been successful. If the authentication was not successful, then the merchant system 210 may halt the transaction. If the authentication process was successful, then the merchant system 210 can continue with processing the transaction by initiating a charge to the consumer's payment account (typically by generating a transaction authorization request message or similar communication). In some embodiments, the merchant system 210 charges the payment account by submitting the account information to an acquirer 244. The acquirer may then send the charge or payment request (e.g., the transaction authorization request) over a private card association network 248 (such as Payment Processing network 26 of FIG. 1) for processing by the payment account or device issuer associated with the account (such as issuer 28 of FIG. 1). In some embodiments, an eCommerce indicator and/or a Cardholder Authentication Verification Value, which indicates that the payment account has been successfully verified, may be included with the charge or payment request.

Figure 3:
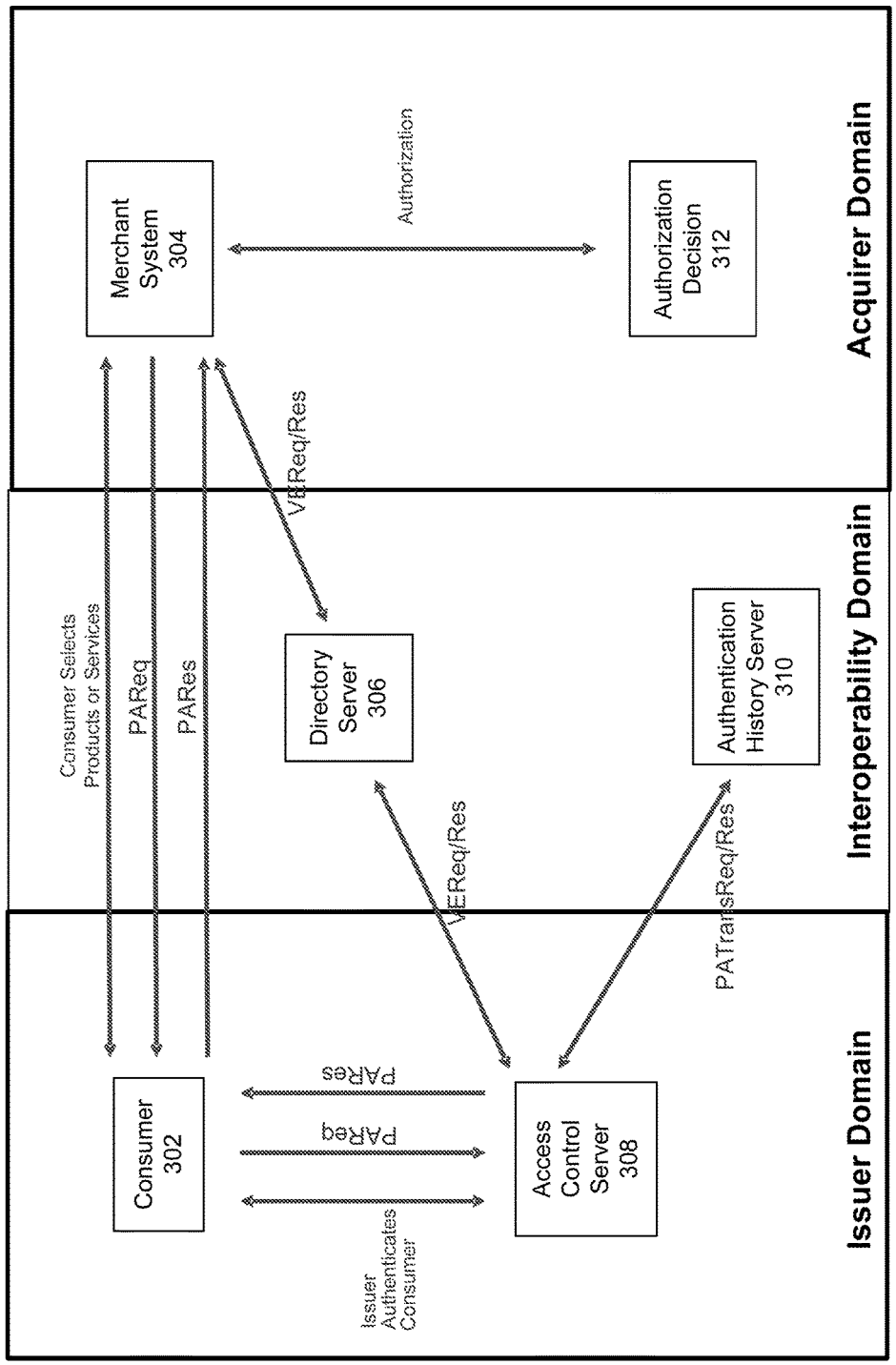
FIG. 3 is a functional block diagram illustrating certain of the elements and operations that may be used to conduct a card not present payment transaction in which a consumer is authenticated using a previously supplied credential.

The transaction flow for the processing of a payment transaction that includes a consumer authentication process may be summarized as follows, where FIG. 3 is a functional block diagram illustrating certain of the elements and operations that may be used to conduct a card not present payment transaction in which a consumer is authenticated using a previously supplied credential:

(1) Consumer 302 selects products or services and finalizes purchase;

(2) Merchant System 304 (e.g., a merchant associated plug-in or similar component) generates a Verify Enrollment Request (VEReq) and sends it to Directory Server (DS, 306);

(3) If card number (or the payment account number associated with the consumer's payment device) is in a participating account number range, Directory Server 306 sends the VEReq message to the appropriate Access Control Server (ACS, 308). Otherwise, the Directory Server 306 creates and sends a VERes message to Merchant System 304 (indicating, for example, that the payment account cannot be authenticated or that an additional authentication process is not available for the account);

(4) Access Control Server 308 responds with a VERes message to Directory Server 306, indicating whether authentication data is available for the card number or payment account;

(5) Directory Server 306 sends the VERes response message to Merchant System 304;

(6) Assuming that card/payment account authentication is available, Merchant System 304 sends a Payer Authentication Request (PAReq) message to Access Control Server 308 via the consumer's browser or other element of their computing system;

(7) Access Control Server 308 receives the Payer Authentication Request message;

(8) Access Control Server 308 authenticates the consumer in a manner appropriate for the card number or payment account (e.g., by requesting and verifying a previously supplied password, credential, chip cryptogram, or PIN, etc.);

(9) Access Control Server 308 generates and digitally signs a Payer Authentication Response (PARes) message that is provided to Merchant System 304 via the consumer's browser. Access Control Server 308 sends a copy of the PARes to the Authentication History Server (AHS) 310 in the form of a PATransReq message, thereby providing the AHS with a record of the authentication attempt and its outcome;

(10) Merchant System 304 receives Payer Authentication Response (PARes) message;

(11) Merchant System 304 validates the Payer Authentication Response message signature; and

(12) Merchant System 304 proceeds with the transaction authorization message exchange and authorization of the transaction via communications with its Acquirer.

Following Step 12, the Acquirer, issuer and payment processing network process the authorization message(s) and return the authorization decision 312 to the merchant.

The authentication history server (AHS) 310 stores a record of the results of each consumer authentication request or process that occurs as part of a card not present transaction. This record of consumer authentication attempts and outcomes may be used to support a historical audit trail for use in dispute resolution processes for disputes arising from transactions involving the consumer.

However, as recognized by the inventor, the AHS data may also be used to assist in the detection of fraud or attempted fraud in payment or other transactions. The fraud detection may be performed in real-time or pseudo real-time (i.e., as a proposed transaction is being processed; specifically, during the processing of a request to authenticate a consumer prior to the generation of a transaction authorization request message). The fraud detection (e.g., a risk assessment) for a proposed, but not yet authorized, transaction may be expressed as a score, a value of a risk associated variable, an indicator corresponding to a fraud possibility above a specified threshold, an indicator of the approval or denial of an authentication request, etc.

As noted, the AHS 310 contains information about each requested or completed consumer authentication operation (whether successful or failed), and in some embodiments, may include, but is not limited to a record of the following data:

Merchant name
Transaction identifier
Order description (the product or service being purchased)
Purchase amount
Purchase currency
Purchase date
Purchase time The AHS (depending on the issuer region) may also have information related to the IP address of the originating transaction. Even without additional data being introduced into the messages, however, the inventive fraud detection can be accomplished by examining the existing data. As an example, the level of risk of a specific transaction may be considered higher if a particular account is used to transact in multiple currencies, from multiple time zones, etc., when such patterns or activities have not been used before.

Further, in some embodiments the messages exchanged between the Directory Server 306, Merchant System 304, and Access Control Server 308 may include, but are not limited to the following data:

the consumer PAN (or other form of payment device identifier) the merchant ID the device category information about the consumer's browser Issuers typically update the AHS data records each night with data concerning the consumer authentication transactions that took place during the day. The Payer Authentication Transaction Request/Response (i.e., the PATransReq/Res) message pair is typically used by an issuer's Access Control Server to update the AHS. One function of a PATransReq message is to transport a PARes message to the AHS (for example, the PARes message that the issuer ACS sends back to the requesting merchant may be wrapped in a new message format and is then sent to the AHS). The PATransRes is a confirmation message that the PATransReq message was successfully received (or that there was a problem with the transmission), sent from the AHS to back to the origination issuer ACS.

However, fraud may occur within such an authentication system as the result of several different actions. These may include, but are not limited to, a stolen authentication credential (such as a password), fraud in registering an authentication credential (such as associating a new credential with an account), or fraud in authenticating a consumer using the credential. Such fraud or attempts at fraud are of concern to merchants, issuers, and payment processors. In response, in some markets, merchants are requiring cardholders to be authenticated as a condition of completing a transaction. The use of an authentication credential is also sometimes used as part of an issuing bank's authorization policies.

To address these and other sources of fraud, embodiments of the present invention may utilize the data or records stored in the AHS and/or the Directory Server (DS), along with other relevant data to: (1) process data acquired from prior transactions and authentication operations to determine rules or indicia that may be used to identify fraudulent or potentially fraudulent transactions or accounts that were used in previous transactions; and/or (2) to apply previously determined rules or indicia to assist in detecting a potentially fraudulent account or transaction during an authentication process or an authorization approval or denial decision for a proposed payment transaction. Note that such rules or indicia may be developed using any suitable analysis or data processing methods, functions, or operations. Such analysis or data processing methods, functions, or operations include, but are not limited to pattern matching, neural network analysis, statistical analysis, linear regression models, mathematical modeling, etc.

To develop such rules or indicia, embodiments of the present invention may access one or more sets of relevant transaction and consumer data. For example, the AHS (as well as other sources within a payment processing network) may contain historical data upon which can provide the basis for models that are predictive of future fraud. The inventive Risk Management Engine (RME) can utilize the outputs of those models during the authentication step or in the development of a rule base that will be used to detect fraudulent or potentially fraudulent transactions. For example, such rules or indicia may include, but are not limited to: (1) the number of times a particular PAN has been used in the last 24 hours; (2) how many times an account was used at a merchant outside the country in which it was issued; (3) if the password or other authentication credential recently reset; (4) if the password was created immediately before the current transaction; or (5) if a number of relatively small transactions were executed just prior to a larger transaction. In operation, the RME may provide either one comprehensive risk score for the transaction, or may provide risk scores for multiple transaction characteristics, with a detailed breakdown that depends on specific areas of concern for a given issuer or merchant. This would be similar to a credit score being returned by a credit agency that indicates there are too many open accounts, or that there are too many outstanding balances, etc.

For example, data stored in the AHS relating to the authentication processes applied to CNP transactions can be used in one or more of the following ways to identify fraudulent accounts, to develop tools to predict the likelihood of fraud in a proposed transaction, or to assist in deciding whether to authorize a proposed transaction:

(1) the combination of AHS transaction authentication records, related transaction data, and independent confirmation of fraudulent activity in previous transactions or accounts can be used to identify other transactions or accounts that are likely to have been fraudulent. In response, an issuer (e.g., via the appropriate Access Control Server) or a Directory Server (DS) can be notified of the likelihood that an account or device is being used in a fraudulent manner—this can permit the DS to refuse to authenticate a consumer trying to conduct a transaction in the future, or can permit an issuer to decline a transaction authorization request for the consumer's account in the future. Note that both of these actions conserve data processing resources and expedite the handling of transactions by allowing a proposed transaction to be declined or modified at an earlier stage of the transaction processing; or (2) the AHS transaction authentication records, related transaction data, and independent confirmation of fraudulent activity in previous transactions or accounts can be analyzed to identify characteristics or indicia of fraudulent activities found in the fraudulent transactions and accounts—the characteristics or indicia can then be used to develop a model or set of rules to assist in "predicting" the likelihood that a future proposed transaction is fraudulent—such a prediction can be used by the DS to refuse to authenticate a consumer trying to conduct the proposed transaction, or by an issuer to decline a transaction authorization request for the consumer's account. As noted, both of these actions conserve data processing resources and expedite the handling of transactions.

Depending on the data processing operations implemented by the inventive Risk Management Engine, other features or functions of the fraud detection or transaction risk assessment methods implemented by the present invention may include:

(1) Velocity checking—to identify if an account number has previously been used at the same merchant for the same amount of funds;

(2) Limit checking—to determine if dollar amount limits for an account have been or may be exceeded by the proposed transaction;

(3) Geo-location checking—checking the consumer's IP address for a CNP transaction to determine the location where a transaction was initiated, and using that information as part of a fraud or risk assessment;

(4) Defining fraud rules and risk or fraud indicia threshold levels at the region, country, MCC (merchant category code), and member levels;

(5) Incorporating Artificial Intelligence techniques (e.g., neural network analysis) and pattern recognition engines or models into the Risk Management Engine;

(6) Enhancing the inputs to the Risk Management Engine to include other sources of data regarding fraudulent transactions (e.g., TC40, GMCMP, MFPP, etc.). The TC40 data is the actual fraud reports submitted to Visa by issuing banks. The GMCMP and the MFPP are Visa compliance programs that look at excessive chargeback and fraud levels. Merchants that exceed certain thresholds are identified by these programs, and as such are considered potential indicators of fraud or other problems; and (7) Enhancing the inputs to the Risk Management Engine to include third party risk management databases such as those provided by Fair Isaac, etc., that may improve the ability to identify a fraudulent account during the first time the account is being used. Effective policing of the first use of an account presents a challenging use case; however, there are certain patterns of use that are effective indicators of the likelihood of fraud. Also, being able to use device characteristics, or authenticating the device itself, are approaches that can be utilized. Using an implementation architecture that allows the incorporation of $3^{rd}$ party tools in the risk evaluation process (either through a simple call-out, via an API, or system integration), may therefore provide additional benefits.

As an example of how the present invention may be used, based on knowledge of which completed transactions were fraudulent or were an attempt to commit a fraudulent act, the inventive system can access the consumer authentication and transaction data stored in the AHS and/or DS and process the data for those transactions to identify patterns, rules, criteria, or other indicia that are associated with previous confirmed fraudulent transactions. The patterns, rules, criteria, or other indicia may then be used in the future to identify potentially fraudulent transactions or to inform an issuer or Directory Server that a specific consumer account may be associated with one or more fraudulent transactions. The issuer can then decline a request to authorize a transaction involving the suspect account or the Directory Server can deny the request to authenticate a consumer attempting to use the suspect account. In either case, embodiments of the present invention provide enhanced real-time fraud detection for transactions that can reduce fraud at an earlier stage of the processing of the transaction (such as prior to an issuer acting on an authorization request message for a transaction). The notice of potential fraud associated with an account or consumer can also be used to prevent use of the account for other types of transactions, such as advances, money transfers, etc. Note that if the Directory Server is notified that an account or transaction has been identified as potentially fraudulent, then the transaction approval process can be stopped or modified prior to the generation of an authorization request message (since the consumer authentication process occurs prior to generation of an authorization request message for a transaction).

Figure 4:
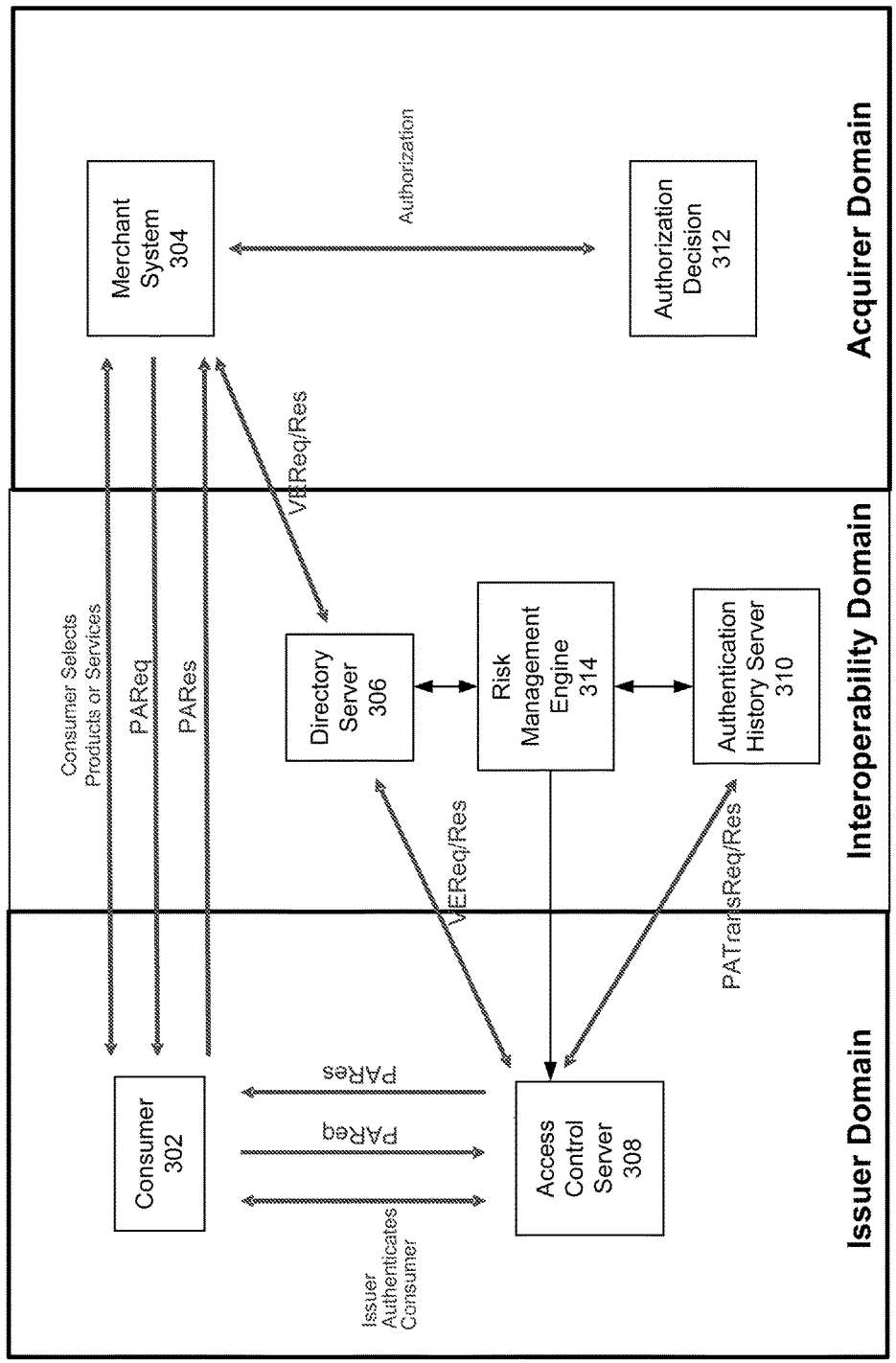
FIG. 4 is a functional block diagram illustrating the use of a Risk Management Engine (RME) as part of the system of elements depicted in FIG. 3 in order to identify fraudulent activity in payment or other transactions, in accordance with some embodiments of the present invention.

FIG. 4 is a functional block diagram illustrating the use of a Risk Management Engine 314 (RME) as part of the system of elements depicted in FIG. 3 in order to identify fraudulent activity in payment or other transactions, in accordance with some embodiments of the present invention. As shown in FIG. 4, Risk Management Engine 314 is part of the interoperability domain and is typically situated so that it has access to and/or can exchange messages or data with Directory Server 306 (DS) and with Authentication History Server 310 (AHS). The interoperability domain may be part of a payment processing network or may be part of a payment processor or payment processor organization (and thus may be implemented as a set of instructions executed by a programmed server that is part of payment processing network 26 of FIG. 1). As shown in FIG. 4, Risk Management Engine 314 may process data stored in AHS 310 (which, as mentioned may be provided to RME 314 using the PATransReq/Res message pair) using one or more rules, heuristics, modeling, mathematical or statistical analysis methods, etc., to identify characteristics of previous confirmed fraudulent transactions, where those characteristics may then be used to generate a model to "predict" if a future transaction is likely to be an attempt to commit fraud. Note that the rules, heuristics, modeling, mathematical or statistical analysis methods may include any suitable process or operation, including, but not limited to, neural network analysis, linear regression models, etc.

If a payment account or consumer is identified as being a likely source of future attempts to commit fraud, or if a particular proposed transaction is suspected of being fraudulent, then Risk Management Engine 314 may notify issuers (depicted as ACS 308 in the issuer domain) and/or Directory Server 306 (depicted as DS in the interoperability domain) of this suspicion. In response, the issuer may respond with a decline message for a present or future request to authorize a transaction involving the account or consumer. Instead of, or in addition to the issuer action, the Directory Server may respond with a message indicating that the account cannot be authenticated for a present or future request to authenticate a consumer using that account in a proposed transaction.

Figure 5:
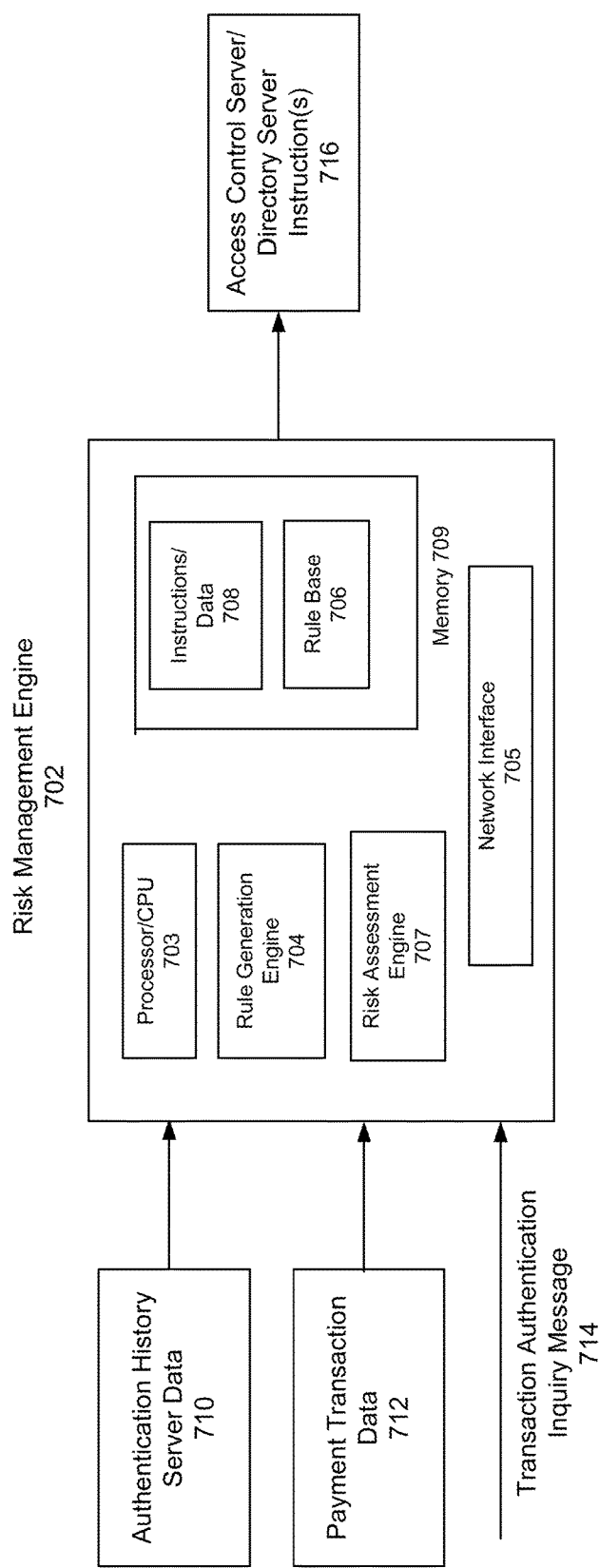
FIG. 5 is a functional block diagram illustrating components of a Risk Management Engine such as that depicted in FIG. 4, and elements that may interact with that apparatus to perform one or more of the transaction risk assessment or fraud detection operations described herein, in accordance with some embodiments of the present invention.

The Risk Management Engine (RME) may be implemented as a server or other data processing apparatus that is programmed to execute a set of instructions. The RME may be an element of the interoperability domain (such as element 314 of FIG. 4, which is typically part of the payment processing network depicted as network 26 of FIG. 1) or may be implemented in another suitable form in the payment processing network. As an example, FIG. 5 is a functional block diagram illustrating components of a Risk Management Engine such as that depicted in FIG. 4, and elements that may interact with that apparatus to perform one or more of the transaction risk assessment or fraud detection operations described herein, in accordance with some embodiments of the present invention.

As shown in the figure, RME 702 may include a processor or central processing unit (CPU) 703 that is programmed to execute a set of instructions, where some or all of those instructions may be stored in a suitable data storage device such as memory 709 (as indicated by element 708, and which may also include data needed to perform the processes or operations resulting from execution of the instructions). RME 702 includes a Rule Generation Engine 704 which may be implemented as a set of executable instructions that are executed by CPU 703. Rule Generation Engine 704 operates to generate one or more "rules" or another form of decision tool from transaction and authentication history data for previous transactions, including transactions that were known to be fraudulent. The rules or other decision tool generated by Rule Generation Engine 704 may be stored in Rule Base 706. The rules stored in Rule Base 706 are used by Risk Assessment Engine 707 to evaluate whether a proposed transaction is likely to be fraudulent (i.e., whether there is an acceptable or an unacceptable level of risk that the transaction is fraudulent). As with Rule Generation Engine 704, Risk Assessment Engine 707 may be implemented as a set of executable instructions that are executed by CPU 703.

Thus, when properly programmed with the appropriate executable instructions, RME 702 may perform one or more functions or operations related to generating fraud rules (as suggested by the Rule Generation Engine 704), accessing a set of generated fraud or risk assessment rules (as suggested by data set 706 for the Rule Base), or evaluating the likelihood or probability that a proposed payment transaction is an attempt to commit fraud (as suggested by the Risk Assessment Engine 707). Note that RME 702 may utilize network interface 705 to enable communication with other elements depicted in FIG. 5.

The data inputs to RME 702 may include, but are not limited to, Authentication History Server data 710 (obtained from AHS 310 of FIG. 4) and Payment Transaction data 712 (which may include indications of known fraudulent accounts or transactions), one or both of which may be used to generate Rule Base 706 using Rule Generation Engine 704. Rule Generation Engine 704 will typically implement one or more processes, methods, or operations to construct the fraud detection or risk assessment rules (or another form of decision tool) using a suitable data processing technique, such as the previously mentioned neural network analysis, statistical methods (such as linear regression models), etc.

After generation of the rule base, an evaluation of the likelihood of fraud associated with a proposed payment transaction may be performed by Risk Assessment Engine 707 in response to a Transaction Authentication Inquiry Message 714. An output of RME 702 may be an instruction, message, or other form of communication with an Access Control Server and/or Directory Server 716 that informs those entities of whether a payment account or proposed transaction should be considered fraudulent.

Figure 6:
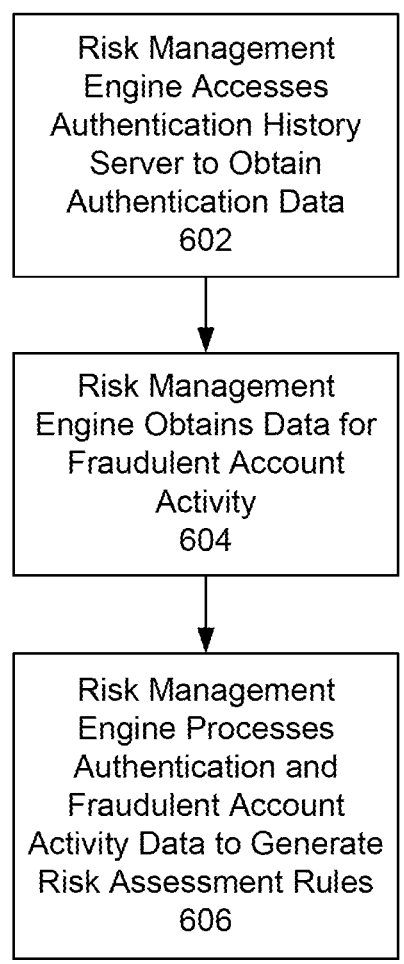
FIG. 6 is a flowchart illustrating a process or operation for utilizing data obtained from authentication processes used as part of card not present transactions to generate a fraud scoring rule for a payment or other transaction, in accordance with some embodiments of the present invention.

As noted, the present invention (specifically, Rule Generation Engine 704 of Risk Management Engine 702) may be used to generate fraud scoring rules (or another form of decision tool or predictive model) for evaluating transactions by processing data stored in an Authentication History Server. FIG. 6 is a flowchart illustrating a process or operation for utilizing data obtained from authentication processes used as part of card not present transactions to generate a fraud scoring rule for a payment or other transaction, in accordance with some embodiments of the present invention. As shown in the figure, in some embodiments, Risk Management Engine 702 of FIG. 5 accesses data stored in an Authentication History Server to obtain data regarding the authentication operations performed for one or more payment accounts as part of a card not present transaction (stage 602). As part of its analysis of the data, Risk Management Engine 702 may also access data regarding confirmed fraudulent payment accounts/transactions or suspicious payment accounts/transactions (stage 604). Based on the accessed data, the Risk Management Engine (and more specifically, Rule Generation Engine 704) processes the data to generate one or more rules, indicia, heuristics, etc. that can be used as a decision tool to produce an assessment of the likelihood of fraud in a future transaction (stage 606, where the generated rules are stored in Rule Base 706 of FIG. 5). This may be accomplished in any suitable manner, for example by using the authentication history data for confirmed fraudulent transactions or payment accounts to identify authentication process characteristics of such transactions or payment accounts. The authentication process characteristics may then be used to generate rules, indicia, heuristics that are common to the authentication history of fraudulent transactions or accounts. The rules, indicia or heuristics may be used to construct a decision tool (such as a predictive model) to evaluate the likelihood of a later transaction being fraudulent. Thus, in some embodiments, data stored in the authentication history server is used (along with other relevant data) to identify characteristics, variables, patterns, etc. that may be used to perform a risk assessment on later transactions. The rules, indicia, heuristics, etc. may be generated by any suitable method, including, but not limited to, neural network analysis, statistical methods such as linear regression models, determining characteristic transaction parameters that are common to fraudulent transactions but are lacking or have different values for non-fraudulent transactions, etc.

Figure 7:
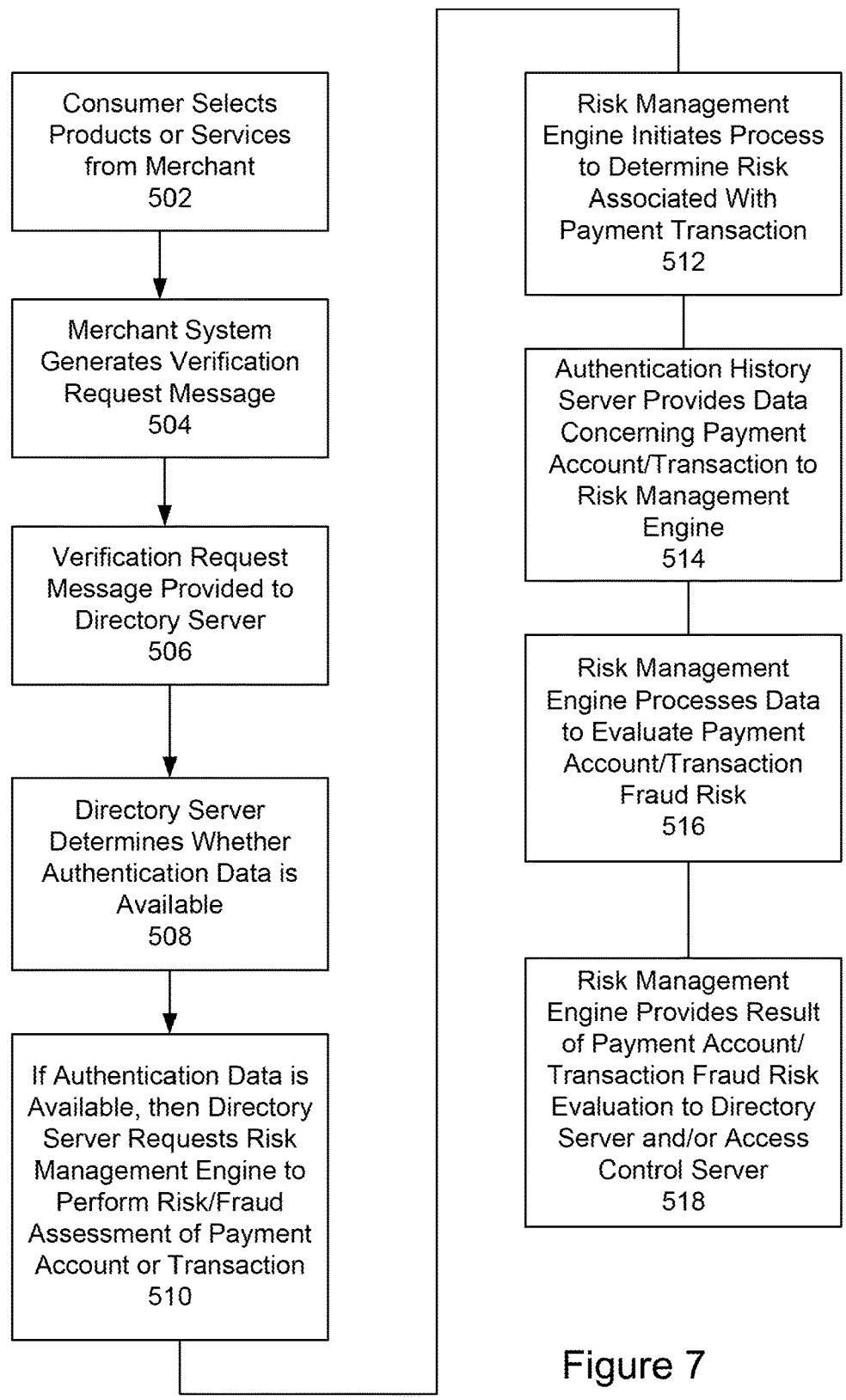
FIG. 7 is a flowchart illustrating a process or operation for utilizing data obtained from authentication processes used as part of card not present transactions to evaluate the potential fraud associated with a proposed payment or other transaction, in accordance with some embodiments of the present invention.

FIG. 7 is a flowchart illustrating a process or operation for utilizing data obtained from authentication processes used as part of card not present transactions to evaluate the potential fraud associated with a proposed payment or other transaction, in accordance with some embodiments of the present invention. As shown in the figure, at stage 502 a consumer selects the products or services that they wish to purchase from a merchant, typically by placing those products or services into a checkout container. At stage 504, the Merchant System (such as Merchant System 304 of FIG. 4) generates a verification request message for the payment account being used by the consumer. The verification request message may contain information about the transaction and the payment account that the consumer wishes to use for the transaction. At stage 506, the verification request message is provided to a Directory Server that is typically part of the payment processing network. The Directory Server then determines whether authentication data is available for the payment account, as shown at stage 508. This may be done, for example, by determining (based on the payment account number or identifier) whether the payment account has previously been associated with consumer authentication data such as a password, credential, etc. If such authentication data is available, then the Directory Server provides transaction data (and if applicable, other relevant information) to the Risk Management Engine (depicted as element 314 of FIG. 4 and element 702 of FIG. 5) which is requested to perform a fraud assessment for the payment account involved in the payment transaction (stage 510). As mentioned, the Risk Management Engine is typically implemented as a programmed server or data processor that is part of the payment processing network. If such authentication data is not available, then the Directory Server may respond to the verification request message with a message indicating that authentication data is not available or that the payment account cannot be authenticated.

The Risk Management Engine processes the data regarding the transaction and payment account to determine the risk of fraud associated with the transaction (stage 512). As part of this processing, the Risk Management Engine may request data from the Authentication History Server regarding the history of authentication operations that were performed involving the payment account (stage 514). The Authentication History Server is typically implemented as a programmed server or data processor that is part of the payment processing network (such as element 310 of FIG. 4). The Risk Management Engine then applies its fraud assessment process (i.e., its decision tool, predictive model or rules) to the data for the payment or other transaction (stage 516). This may include evaluating if the account or transaction has a fraud likelihood (or probability) that exceeds a specified threshold, for example. If the fraud assessment performed by the Risk Management Engine indicates an acceptable level of risk, then the Risk Management Engine notifies the Access Control Server (or, in an alternative embodiment, the Directory Server) that the payment account may be authenticated and the process continues as described with reference to FIGS. 3 and 4 (and as depicted at stage 518).

However, if the fraud assessment performed by the Risk Management Engine indicates that the payment account or transaction is suspected of being fraudulent, then the Risk Management Engine may perform one or both of the following operations (as depicted at stage 518):

(a) informing the Directory Server, which can then return a message indicating that the payment account cannot be authenticated or has failed authentication in the current transaction (this may also be done when future requests are made to utilize the payment account in a transaction); or (b) informing the Access Control Server for the issuer of the payment account, which can then return an appropriate response to the present request (or to future requests) to authenticate the payment account in a transaction.

Note that by informing either or both of the Directory Server and Access Control Server that a payment account is suspected of being used in an attempt to commit fraud, the present invention may provide an "early warning" of a fraudulent transaction. In some embodiments, this warning is provided at an earlier stage of the processing of the transaction than would typically occur since it is provided prior to the generation or processing of a transaction authorization request message. This may reduce the data processing and message exchange operations normally used (such as the generation of a transaction authorization request message) since the potentially fraudulent transaction is identified prior to when it would be identified in the absence of the present invention. Embodiments of the present invention may also act to prevent fraud that would not typically be identified as the result of standard fraud assessment techniques that do not utilize the data from CNP authentication operations stored in the Authentication History Server.

Figure 8:
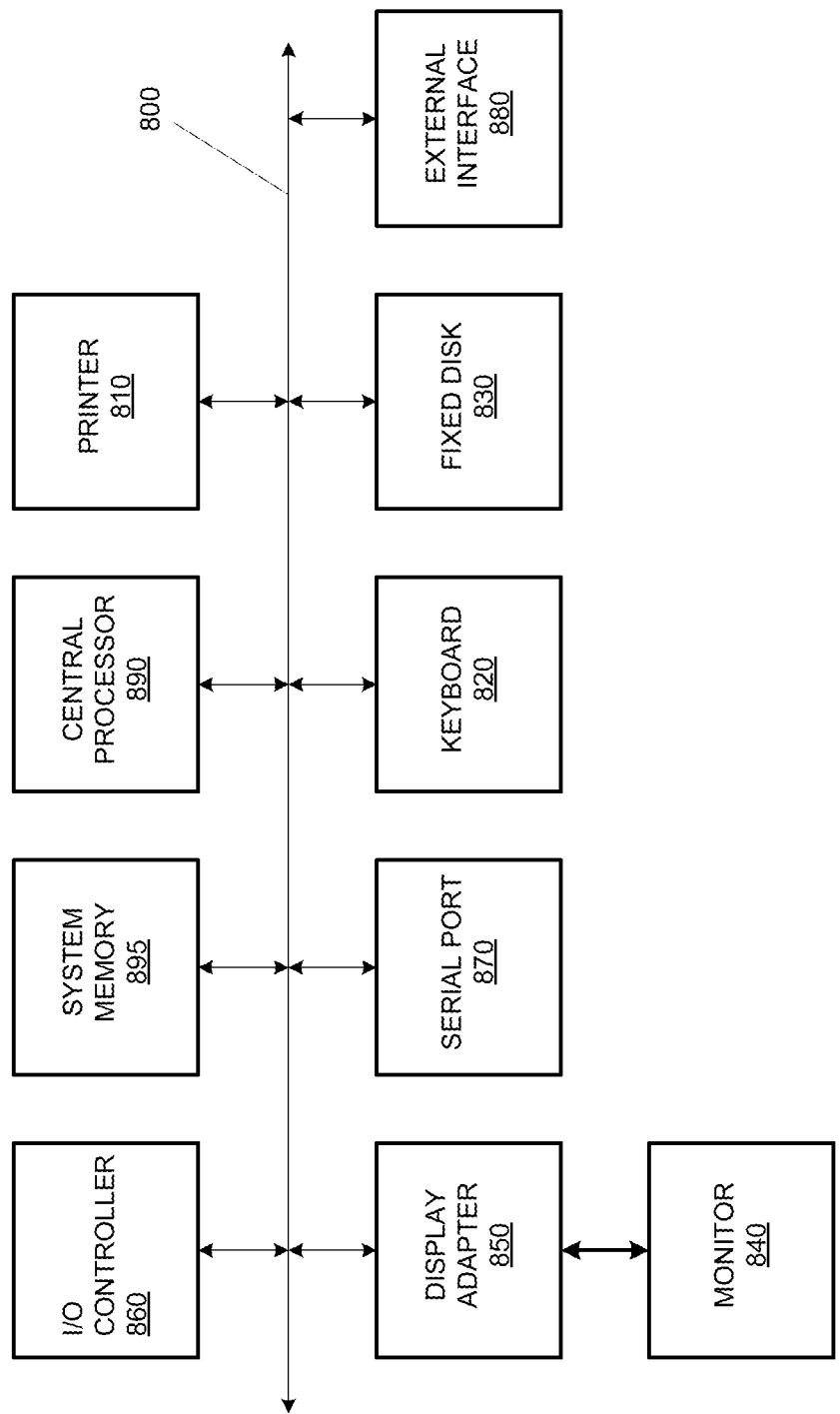
FIG. 8 is a block diagram of elements that may be present in a computing device or system configured to execute a method or process to identify fraudulent payment transactions and to prevent future fraudulent transactions, in accordance with some embodiments of the present invention.

As noted, in some embodiments, the inventive methods, processes or operations for reducing fraud in card not present transactions may be wholly or partially implemented in the form of a set of instructions executed by a programmed central processing unit (CPU) or microprocessor. The CPU or microprocessor may be incorporated in an apparatus, server or other data processing device operated by, or in communication with, a node of the authorization network. As an example, FIG. 8 is a block diagram of elements that may be present in a computing device or system configured to execute a method or process to identify fraudulent payment transactions and to prevent future fraudulent transactions, in accordance with some embodiments of the present invention. Some or all of the elements depicted in FIG. 8 may be present in systems operated by an issuer, merchant, or Acquirer, or in an element of a payment processing network. The subsystems shown in FIG. 8 are interconnected via a system bus 800. Additional subsystems such as a printer 810, a keyboard 820, a fixed disk 830, a monitor 840, which is coupled to a display adapter 850, and others are shown. Peripherals and input/output (I/O) devices, which couple to an I/O controller 860, can be connected to the computing system by any number of means known in the art, such as a serial port 870. For example, the serial port 870 or an external interface 880 can be used to connect the computing system to a wide area network such as the Internet, a mouse input device, or a scanner. The interconnection via the system bus 800 allows a central processor 890 to communicate with each subsystem and to control the execution of instructions that may be stored in a system memory 895 or the fixed disk 830, as well as the exchange of information between subsystems. The system memory 895 and/or the fixed disk 830 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method, comprising:
in response to a request, from a merchant computer, to perform a fraud assessment process for a payment account that is being used to conduct a payment transaction prior to initiation of authorization processing for the payment transaction:
receiving, by an access control server and from a risk management engine, an early warning message for the payment transaction in an authentication request message prior to generation of an authorization request message by the access control server, wherein the risk management engine generates the early warning message based at least in part on the fraud assessment using rules generated from authentication history data, the authentication history data comprising an archive of authentication operations performed or attempted using an authentication protocol that requires a user to provide an authentication credential prior to the authorization processing; and
transmitting, by the access control server to the merchant computer associated with the payment transaction, a decline message for the authentication request message based at least in part on the early warning message.

2. The computer-implemented method of claim 1, wherein generating the rules comprises applying a linear regression model to generate the rules.

3. The computer-implemented method of claim 1, wherein the fraud assessment process comprises one or more of a velocity check, a limit check, or a geo-location check.

4. The computer-implemented method of claim 1, wherein the access control server is operated by an issuer of the payment account.

5. The computer-implemented method of claim 1, wherein the request to perform the fraud assessment is in response to receipt of a verify enrollment request by a directory server.

6. The computer-implemented method of claim 1, wherein the early warning message also prevents, by the access control server, generation of a payer authentication request and a response message and transmitted for the payment transaction.

7. The computer-implemented method of claim 1, wherein an authentication history server stores the authentication history data.

8. The computer-implemented method of claim 7, further comprising identifying, by the risk management engine, authentication process characteristics common to confirmed fraudulent transactions in the authentication history data.

9. The computer-implemented method of claim 8, wherein generating the rules is further based at least in part on the authentication process characteristics.

10. The computer-implemented method of claim 1, wherein receiving the early warning message is further based at least in part a determination that a risk of the payment transaction exceeds a specified threshold and is suspected of being fraudulent, the risk based at least in part on the fraud assessment process for the payment transaction.

11. The computer-implemented method of claim 1, wherein the authentication credential includes a password.

12. The computer-implemented method of claim 1, wherein the authentication protocol is based on a 3D secure protocol.

13. An apparatus for reducing fraud in transactions, comprising:
- a processor programmed to execute a set of instructions;
- a memory coupled to the processor for storing the set of instructions; and
- the set of instructions stored in the memory, wherein when executed by the processor the apparatus reduces fraud in the transactions in response to a request, from a merchant computer, to perform a fraud assessment process for a payment account that is being used to conduct a payment transaction prior to initiation of authorization processing for the payment transaction by:
- receiving, by the apparatus and from a risk management engine, an early warning message for the payment transaction in an authentication request message prior to generation of an authorization request message by the access control server, wherein the risk management engine generates the early warning message based at least in part on the fraud assessment using rules generated from authentication history data, the authentication history data comprising an archive of authentication operations performed or attempted using an authentication protocol that requires a user to provide an authentication credential prior to the authorization processing; and
- transmitting, by the apparatus to the merchant computer associated with the payment transaction, a decline message for the authentication request message based at least in part on the early warning message.

14. The apparatus of claim 13, wherein generating the rules comprises applying a linear regression model to generate the rules.

15. The apparatus of claim 13, wherein the fraud assessment process comprises one or more of a velocity check, a limit check, or a geo-location check.

16. The apparatus of claim 13, wherein the apparatus is operated by an issuer of the payment account.

17. The apparatus of claim 13, wherein an authentication history server stores the authentication history data.

18. The apparatus of claim 17, further comprising identifying, by the risk management engine, authentication process characteristics common to confirmed fraudulent transactions in the authentication history data.

19. An access control server, comprising:
- a processor programmed to execute a set of instructions;
- a memory coupled to the processor for storing the set of instructions; and
- the set of instructions stored in the memory, wherein when executed by the programmed processor implements a method comprising:
- in response to a request, from a merchant computer, to perform a fraud assessment process for a payment account that is being used to conduct a payment transaction prior to initiation of authorization processing for the payment transaction:
- receiving, by an access control server and from a risk management engine, an early warning message for the payment transaction in an authentication request message prior to generation of an authorization request message by the access control server, wherein the risk management engine generates the early warning message based at least in part on the fraud assessment using rules generated from authentication history data, the authentication history data comprising an archive of authentication operations performed or attempted using an authentication protocol that requires a user to provide an authentication credential prior to the authorization processing; and
- transmitting, by the access control server to the merchant computer associated with the payment transaction, a decline message for the authentication request message based at least in part on the early warning message.

20. The access control server of claim 19, wherein receiving the early warning message is further based at least in part a determination that a risk of the payment transaction exceeds a specified threshold and is suspected of being fraudulent, the risk based at least in part on the fraud assessment process for the payment transaction.

* * * * *